(12) United States Patent
Kawai et al.

(10) Patent No.: US 7,384,708 B2
(45) Date of Patent: *Jun. 10, 2008

(54) NON-AQUEOUS ELECTROLYTE BATTERY

(75) Inventors: Tetsuo Kawai, Osaka (JP); Atsushi Yamano, Osaka (JP); Noriyuki Yabushita, Hyogo (JP); Tadashi Sakata, Hyogo (JP); Hideki Nishihama, Osaka (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/331,731

(22) Filed: Jan. 13, 2006

(65) Prior Publication Data

US 2006/0115728 A1 Jun. 1, 2006

Related U.S. Application Data

(63) Continuation of application No. 10/316,170, filed on Dec. 10, 2002.

(30) Foreign Application Priority Data

Dec. 11, 2001 (JP) ............................. 2001-376832
Dec. 25, 2001 (JP) ............................. 2001-392757
May 17, 2002 (JP) ............................. 2002-143008

(51) Int. Cl.
*H01M 6/16* (2006.01)

(52) U.S. Cl. ..................... 429/329; 429/330; 429/332; 429/333; 429/340; 429/162; 429/172

(58) Field of Classification Search ................ 429/329, 429/330, 332, 333, 340, 162, 172
See application file for complete search history.

(56) References Cited

U.S. PATENT DOCUMENTS 5,079,109 A * 1/1992 Takami et al. .............. 429/333
6,451,478 B1 * 9/2002 Okahisa et al. ............. 429/162
6,866,966 B2 * 3/2005 Hamamoto et al. ......... 429/340
6,927,001 B1 * 8/2005 Hamamoto et al. ......... 429/332

FOREIGN PATENT DOCUMENTS

| JP | 9-306445 | * 11/1997 |
| JP | 2000268857 | 9/2000 |
| JP | 1146586 | 10/2001 |

OTHER PUBLICATIONS

Extended European Search Report issued in EP Application No. 07002843.6 mailed on Jul. 5, 2004, 4 pages.

Patent Abstracts of Japan (European Patent Office); corresponds to Publication No. 2000-268857; (9 pages).

* cited by examiner

*Primary Examiner*—Laura Weiner
(74) *Attorney, Agent, or Firm*—Osha Liang LLP

(57) ABSTRACT

A non-aqueous electrolyte battery of the present invention includes a non-aqueous electrolyte containing a lithium salt, a cyclic sultone derivative, and an acid anhydride, wherein the non-aqueous electrolyte contains the cyclic sultone derivative in an amount of 0.3 to 3% by mass and the non-aqueous electrolyte contains the acid anhydride in an amount of 0.3 to 3% by mass. Furthermore, the non-aqueous electrolyte battery includes at least one selected from a cyclic sultone derivative and an acid anhydride, and an electrolyte salt. The electrolyte salt contains lithium salt A and lithium salt B. The lithium salt A is at least one selected from $LiBF_4$, $LiPF_6$, $LiAsF_6$, and $LiSbF_6$, and the lithium salt B is a lithium salt other than the lithium salt A. The electrolyte contains the lithium salt A in an amount of 2 mol % or more.

10 Claims, 1 Drawing Sheet

NON-AQUEOUS ELECTROLYTE BATTERY

CROSS-REFERENCE TO RELATED APPLICATIONS

This application is a continuation application of U.S. patent application Ser. No. 10/316,170 entitled "NON-AQUEOUS ELECTROLYTE BATTERY" filed on Dec. 10, 2002.

BACKGROUND OF THE INVENTION

1. Field of the Invention

The present invention relates to a non-aqueous electrolyte battery, and more specifically, to a non-aqueous electrolyte battery suitable for use in a high-temperature atmosphere.

2. Description of the Related Art

Recently, there is an increasing demand for a battery that can be used as a power source for equipment used in a high-temperature atmosphere (higher than 100° C.), such as a pressure sensor in a tire. A potential candidate for such a battery includes a non-aqueous electrolyte battery such as a lithium primary battery and a lithium ion secondary battery.

As the non-aqueous electrolyte battery to be used for the above-mentioned purpose, a lithium primary battery using manganese dioxide or graphite fluoride as a positive active material and lithium or a lithium alloy as a negative electrode, and a lithium ion secondary battery using lithium cobaltate or lithium manganate as a positive active material and a carbon material as a negative electrode are considered to be suitable due to their excellent load characteristics and low-temperature characteristics. However, when these batteries are left or used at a high temperature, a carbonic ester (propylene carbonate, ethylene carbonate, methyl ethyl carbonate, etc.) that is a solvent of an electrolyte reacts with the positive active material to generate gas such as carbon dioxide, which causes the batteries to expand.

In particular, when a manganese-containing oxide such as manganese dioxide is used as a positive active material, the above-mentioned generation of gas becomes conspicuous due to the catalyst function of the positive active material. In a temperature region higher than 100° C., such a problem becomes more serious. Furthermore, the following also is found: when a battery discharged by about 50% or more is used in a high-temperature atmosphere or left for a long period of time, gas is generated suddenly due to hydrogen and hydrocarbon such as methane, which causes the battery to expand. In this case, the generation of gas is presumed to be caused by the reaction between a solvent of an electrolyte and lithium at a negative electrode, as well as the reaction between the solvent of the electrolyte and the positive active material.

On the other hand, in the case of an ordinary coin-type primary battery, in order to seal the battery, packing made of polypropylene (PP) (which often is referred to as a "gasket") mainly is used. Polypropylene is a packing material with sufficient reliability for general use and is inexpensive. However, in a temperature region higher than 100° C. that is close to the melting point of polypropylene, polypropylene is softened to make it impossible to obtain sufficient strength. Therefore, polypropylene is not suitable as a packing material for a battery intended for a high temperature.

As a packing material intended for a high temperature, as described in JP 8(1996)-153500 A, a heat-resistant resin having a melting point of 240° C. or higher (e.g., a tetrafluoroethylene-perfluoroalkoxyethylene copolymer (PFA), polyphenylene sulfide, and polyether ether ketone) was studied.

An olefin-type packing material such as polypropylene, which has been used generally, allows gas generated in a battery to pass therethrough gradually to dissipate out of the battery, whereby an increase in pressure in the battery is alleviated. The packing composed of the above-mentioned heat-resistant resin has sufficient durability even at a high temperature; however, transmittance of gas is very small. Therefore, gas accumulates in the battery, and the battery expands due to an increase in pressure. Needless to say, in the case where glass hermetic seal having hermeticity higher than that of sealing with the heat-resistant packing, the expansion of the battery becomes further conspicuous.

There are various reasons for avoiding expanding a battery. When a battery expands, equipment to be used is damaged, and the contact between electrodes and a current collector becomes insufficient, which decreases battery performance and impairs reliability of the battery.

In order to solve the above-mentioned problem, JP 11(1999)-162511 A (EP 1030399), JP 2000-3724 A (U.S. Pat. No. 6,033,809), JP 2000-123868 A, JP 2000-323171 A, and the like disclose the addition of a cyclic sultone derivative such as 1,3-propanesultone to an electrolyte for the purpose of enhancing cycle characteristics of a non-aqueous electrolyte battery and suppressing the generation of gas. Furthermore, JP 4(1992)-355065 A (U.S. Pat. No. 5,296, 319), JP 7(1995)-122297 A, and the like disclose that an acid anhydride is added to an electrolyte to reduce the amount of moisture in the electrolyte so as to enhance storage characteristics of a battery at a high temperature. These additives respectively are relatively effective for suppressing the generation of gas in a battery at a temperature of about 60° C. to 80° C. and enhancing storage characteristics.

In atmospheres having temperatures of 100° C. or higher, these additives are not effective enough for the above purpose.

Furthermore, it also is found that although the above-mentioned additives are sufficiently effective to a battery before discharging or with a small discharge depth, they do not exhibit effects as expected with respect to the battery that has been discharged to some degree.

SUMMARY OF THE INVENTION

In one aspect, the present invention relates to a non-aqueous electrolyte battery including a positive electrode, a negative electrode, a separator, and a non-aqueous electrolyte, wherein the non-aqueous electrolyte contains a lithium salt, a cyclic sultone derivative, and an acid anhydride, the non-aqueous electrolyte contains the cyclic sultone derivative in an amount of 0.3 to 3% by mass, and the non-aqueous electrolyte contains the acid anhydride in an amount of 0.3 to 3% by mass.

In one aspect, the present invention relates to a non-aqueous electrolyte battery including a positive electrode, a negative electrode, a separator, and a non-aqueous electrolyte, wherein the non-aqueous electrolyte contains at least one selected from the group consisting of a cyclic sultone derivative and an acid anhydride, and an electrolyte salt, the electrolyte salt contains lithium salt A and lithium salt B, the lithium salt A is at least one selected from the group consisting of $LiBF_4$, $LiPF_6$, $LiAsF_6$, and $LiSbF_6$, the lithium salt B is a lithium salt other than the lithium salt A, and the electrolyte salt contains the lithium salt A in an amount of 2 mol % or more.

In one aspect, the present invention relates to a non-aqueous electrolyte battery including a positive electrode, a negative electrode, a separator, a non-aqueous electrolyte, and a sealing member, wherein the non-aqueous electrolyte contains a solvent and a cyclic sultone derivative, the solvent contains an ether having a boiling point of 120° C. or higher, the non-aqueous electrolyte contains the cyclic sultone derivative in an amount of 0.5 to 5% by mass, and the sealing member includes a packing made of a heat-resistant resin or glass hermetic seal.

DESCRIPTION OF THE PREFERRED EMBODIMENTS

Figure 1:
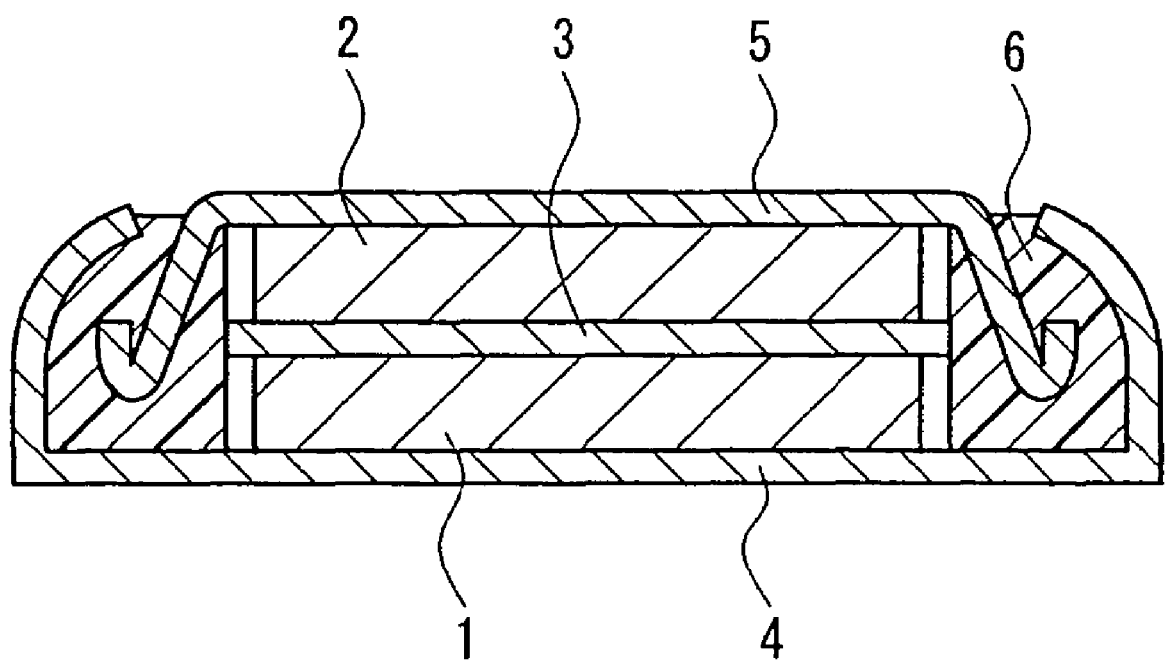
FIG. 1 shows a cross-sectional view schematically showing an example of a non-aqueous electrolyte battery of the present invention.

The present invention provides a non-aqueous electrolyte battery suitable for use in a high-temperature atmosphere by decreasing the generation of gas in the battery to suppress the expansion of the battery while keeping excellent load characteristics and low-temperature characteristics peculiar to the non-aqueous electrolyte battery. Furthermore, in certain embodiments, the above-mentioned effects can be maintained irrespective of a discharge depth of the non-aqueous electrolyte battery.

Other advantages of the present embodiment will become apparent to those skilled in the art upon reading and understanding the following detailed description with reference to the accompanying figures.

In one embodiment, a non-aqueous electrolyte is obtained by dissolving an electrolyte salt in a solvent or a mixed solvent of at least two kinds selected from the group consisting of a cyclic carbonic ester such as propylene carbonate, ethylene carbonate, butylene carbonate, and vinylene carbonate; a chain carbonic ester such as dimethyl carbonate, diethyl carbonate, and methyl ethyl carbonate; and an ether such as 1,2-dimethoxyethane, diglyme (diethylene glycol dimethyl ether), triglyme (triethylene glycol dimethyl ether), tetraglyme(tetraethylene glycol dimethyl ether), methoxyethoxyethane, 1,2-diethoxyethane, and tetrahydrofuran. In particular, as carbonic ester, propylene carbonate, ethylene carbonate, butylene carbonate, and the like, having a boiling point of 120° C. or higher, are preferable. Furthermore, as ether, diethoxyethane, diglyme, and the like, having a boiling point of 120° C. or higher, are preferable.

When the molecular weight of ether is increased, the freezing point and viscosity also are increased. Therefore, a solvent having a low viscosity and freezing point such as dimethoxyethane is preferable in terms of the low-temperature characteristics of a battery. However, due to a low boiling point, such a solvent increases the pressure in the battery at a temperature higher than 100° C. As a result, in the case of using a general-purpose olefin type packing, a solvent is more likely to dissipate through the packing. In the case of a packing using a heat-resistant resin, gas accumulates in a battery, and the battery is likely to expand due to an increase in pressure.

In contrast, when a solvent having a high boiling point such as diethoxyethane and diglyme is used, an increase in internal pressure of a battery is suppressed, and the expansion of the battery is prevented when stored at a high temperature, whereby storage characteristics can be enhanced.

In the case where the above-mentioned carbonic ester and ether are mixed, the mixing ratio thereof preferably is in a range of 30:70 to 70:30 (carbonic ester:ether) in a volume ratio. A cyclic carbonic ester and a chain carbonic ester also may be mixed.

In the present embodiment, it is preferred to use at least one cyclic sultone derivative. In particular, as the cyclic sultone derivative to be contained in the electrolyte, 1,3-propanesultone or 1,4-butanesultone is preferred.

It is desirable that the adding amount of the cyclic sultone derivative is set to be 0.5 to 5% by mass based on the total amount of an electrolyte including the derivative. Due to the addition of the cyclic sultone derivative, a coating capable of suppressing the reaction with the solvent of the electrolyte is formed on the surface of a positive electrode, and the generation of gas in the battery is decreased to suppress the expansion of the battery. If the amount of the cyclic sultone derivative is 0.5% by mass or more, this effect is exhibited sufficiently. Furthermore, when the amount of the cyclic sultone derivative is increased, although the effect of suppressing the expansion of a battery is enhanced, the resistance in the battery is increased, resulting in a decrease in closed-circuit voltage (CCV). Simultaneously with this, the volume also becomes likely to decrease. Therefore, it is desirable that the adding amount is set to be 5% by mass or lower based on the total amount of the electrolyte. In particular, when the adding amount of the cyclic sultone derivative is 3% by mass or less, discharge characteristics become satisfactory.

Examples of the acid anhydride include mellitic anhydride, malonic anhydride, maleic anhydride, butyric anhydride, propionic anhydride, pulvic anhydride, phthalonic anhydride, phthalic anhydride, pyromellitic anhydride, lactic anhydride, naphthalic anhydride, toluic anhydride, thiobenzoic anhydride, diphenic anhydride, citraconic anhydride, diglycolamidic anhydride, acetic anhydride, succinic anhydride, cinnamic anhydride, glutaric anhydride, glutaconic anhydride, valeric anhydride, itaconic anhydride, isobutyric anhydride, isovaleric anhydride, and benzoic anhydride. These acid anhydrides may be used alone or in combination of at least two kinds.

It is desirable that the adding amount of acid anhydride also is set to be 0.5 to 5% by mass based on the total amount of the electrolyte including the acid anhydride, in the same way as in the cyclic sultone derivative. Furthermore, in order to obtain satisfactory discharge characteristics, it is desirable that the adding amount of the acid anhydride is set to be 3% by mass or less.

Herein, in the case of adding both the cyclic sultone derivative and the acid anhydride, even the addition of a small amount can suppress the generation of gas effectively. Therefore, in this case, the problem of a decrease in load characteristics caused by an additive can be reduced. Furthermore, due to the presence of both the additives, it is expected that the effects of them can be enhanced, and both the side effects can be suppressed. For example, in the case where the acid anhydride is present in an electrolyte, the acid anhydride reacts with water in the electrolyte to generate an acid. The acid further reacts with a negative electrode to form a coating on the surface of the negative electrode in the form of a lithium salt or the like, thereby allowing the load characteristics to be decreased easily. However, it is considered that such a reaction is inhibited due to the presence of the cyclic sultone derivative in the electrolyte.

In the case of adding both the cyclic sultone derivative and the acid anhydride, preferably, each adding amount should be set to be 0.3 to 3% by mass. It is desirable that at least one adding amount is set to be 0.5% by mass or more, and it is more desirable that each adding amount is set to be 0.5% by mass. Furthermore, by setting the total adding amount to be 1.7 to 3.5% by mass, the above-mentioned cooperated effects can be enhanced further.

Examples of an electrolyte salt to be dissolved in the above-mentioned electrolyte include at least one lithium salt (hereinafter, referred to as a "lithium salt A") selected from $LiBF_4$, $LiPF_6$, $LiAsF_6$, and $LiSbF_6$, and at least one lithium salt (hereinafter, referred to as a "lithium salt B"), e.g., $LiClO_4$, $LiC_nF_{2n+1}SO_3$ such as $LiCF_3SO_3$ and $LiC_4F_9SO_3$, $LiN(CF_3SO_2)_2$, $LiN(C_2F_5SO_2)_2$, $LiC(CF_3SO_3)_3$, $LiCF_3CO_2$, $LiB_{10}Cl_{10}$, lower fatty acid lithium, $LiAlCl_4$, LiCl, LiBr, LiI, chloroboranelithium, lithium tetraphenylborate, and the like. In the case where manganese dioxide is used as a positive active material, due to the coexistence thereof, a lithium imide salt (e.g., $LiClO_4$, $LiC_nF_{2n+1}SO_3$ such as $LiCF_3SO_3$, and $LiC_4F_9SO_3$, $LiN(CF_3SO_2)_2$, LiN $(C_2F_5SO_2)_2$, and the like) preferably is used.

The concentration of the electrolyte salt in the electrolyte is not particularly limited. However, the concentration is preferably 0.2 to 2 mol/dm$^3$, more preferably 0.3 to 1.5 mol/dm$^3$.

Furthermore, by using the mixture of the above-mentioned lithium salt A and lithium salt B, the effects of the above-mentioned additives are likely to be exhibited even in a battery that has been discharged to some degree. Furthermore, the generation of gas can be suppressed sufficiently when such a battery is stored. In this case, the proportion of the lithium salt A should be set to be 2 mol % or more based on the total amount of the electrolyte salt. On the other hand, the lithium salt A is likely to be decomposed by a trace amount of water present in a battery. Therefore, the proportion of the lithium salt A desirably is set to be 20 mol % or less based on the total amount of the electrolyte salt.

Considering the characteristics of a battery as a whole, $LiBF_4$ or $LiPF_6$ preferably is used as the lithium salt A, and at least one selected from $LiClO_4$, $LiCF_3SO_3$, $LiC_4F_9SO_3$, $LiN(CF_3SO_2)_2$, and $LiN(C_2F_5SO_2)_2$ preferably is used.

In the present embodiment, as the positive active material, those which are used generally as a positive active material of a lithium primary battery, a lithium ion secondary battery, or the like can be used. For example, in addition to $LiCoO_2$, $LiNiO_2$, and $LiNi_xCo_{1-x}O_2$, a manganese-containing oxide such as $LiMnO_2$, $LiMnO_2$, $LiNi_xMn_{1-x}O_2$, $LiMn_3O_6$ and manganese dioxide, and fluorocarbon can be used. In particular, when manganese dioxide which is highly reactive with the electrolyte, is used, the effects of the present embodiment are exhibited conspicuously. For producing a positive electrode, generally, a conductive assistant and a binder are used in addition to the positive active material. As the conductive assistant, carbon black, scalelike graphite, ketchen black, acetylene black, fibrous carbon, and the like are used. As the binder, for example, polytetrafluoroethylene, polyvinylidene fluoride, carboxymethyl cellulose, styrene-butadiene rubber, and the like are used.

For producing a positive electrode, a positive electrode mixture prepared by mixing a positive active material, a conductive assistant, and a binder is subjected to pressure forming. Alternatively, the positive electrode mixture is dispersed in water or an organic solvent to prepare a paste containing the positive electrode mixture, and this paste is applied to a current collector made of a metal foil, expanded metal, a plain-woven mesh, or the like, followed by drying and pressure forming. The method for producing a positive electrode is not limited to the above-mentioned method. Other methods may be used.

There is no particular limit to a negative active material. Those which are used as a negative active material of a lithium primary battery, a lithium ion secondary battery, or the like can be used. Preferable specific examples thereof include metal lithium, a lithium alloy such as lithium-aluminum, lithium-lead, lithium-bismuth, lithium-indium, lithium-gallium and lithium-indium-gallium, a carbon material, and a metal oxide such as lithium titanium oxide. These negative active materials can be used alone as a negative electrode. Alternatively, in the same way as in the positive electrode, a negative electrode mixture is prepared, and the mixture is applied to a current collector, followed by drying and pressure forming. In the case of using metal lithium, a lithium alloy, or the like, the resultant mixture may be crimped onto a current collector made of a metal foil, a metal net, or the like.

As a separator, any of a microporous resin film and resin non-woven fabric can be used. Examples thereof include polyolefin such as polyethylene, polypropylene, and polymethylpentene. In addition, for the purpose of heat resistance, fluorine resin such as a tetrafluoroethylene-perfluoroalkoxyethylene copolymer, polyphenylene sulfide, polyether ether ketone, polybutylene terephthalate, and the like are used. Furthermore, by using a separator with a layered structure obtained by stacking a plurality of microporous films and non-woven fabrics made of the above materials, stacking a plurality of miroporous films, or stacking a plurality of non-woven fabrics, reliability in the case of use in a high-temperature atmosphere can be enhanced.

The above-mentioned positive electrode, negative electrode, electrolyte, and separator are sealed in a battery case made of a metal can, a laminate film, or the like, whereby a non-aqueous electrolyte battery is assembled. In the case of sealing the battery case by using a packing as a sealing member, as the material for the packing, for example, polypropylene and nylon can be used. In addition, for the purpose of heat resistance, a heat-resistant resin having a melting point higher than 240° C. such as fluorine resin (e.g., a tetrafluoroethylene-perfluoroalkoxyethylene copolymer), polyphenylene ether, polysulfone, polyarylate, polyether sulfone, polyphenylene sulfide, polyether ether ketone, and the like can be used. Furthermore, as the sealing member, glass hermetic seal also can be used. The glass hermetic seal is a sealing member using soda-lime glass. The glass hermetic seal is applied, in a molten state, to a metal material so as to be bonded thereto, thereby sealing the metal material. The glass hermetic seal is excellent in hermeticity.

Hereinafter, various embodiments will be described specifically by way of examples.

In one embodiment, a non-aqueous electrolyte primary battery was produced as follows. First, manganese dioxide as a positive active material, carbon black as a conductive assistant, polytetrafluoroethylene as a binder were prepared, and they were mixed in a mass ratio of 90:5:5 to obtain a positive electrode mixture. Then, the positive electrode mixture was subjected to pressure forming to produce a positive electrode. As a negative electrode, a lithium foil was used. As a separator, a layered structure of a microporous polypropylene film and polypropylene non-woven fabric was used. As a sealing member, a packing made of polyphenylene sulfide was used. As a result, a coin-type non-aqueous electrolyte battery with a thickness of 5 mm and a diameter of 24 mm having a configuration shown in FIG. 1 was assembled.

FIG. 1 shows an exemplary battery, in accordance with one aspect of the present invention. A positive electrode 1 is accommodated in a positive electrode can 4 made of stainless steel, and a negative electrode 2 is placed on the positive electrode 1 via a separator 3. The negative electrode 2 is made of a lithium foil, and is crimped onto the inner surface of a negative electrode can 5 made of stainless steel. A non-aqueous electrolyte is injected into the battery in an amount of 0.5 cm$^3$, and an opening end of the positive electrode can 4 is compressed inward, whereby an annular packing 6 made of polyphenylene sulfide provided on the periphery of the negative electrode can 5 is pressed. As a result, the periphery of the negative electrode can 5 is in contact with the inner peripheral surface of the opening end of the positive electrode can 4 under pressure, whereby the opening of the positive electrode can 4 is sealed.

EXAMPLE 1

First, propylene carbonate and 1,2-dimethoxyethane were mixed in a volume ratio of 1:1 to obtain a mixed solvent. LiClO$_4$ was dissolved in the mixed solvent in an amount of 0.5 mol/dm$^3$. Then, 1,3-propanesultone and phthalic anhydride were added to the resultant mixed solvent so that the contents thereof respectively became 0.5% by mass to obtain an electrolyte. The electrolyte thus obtained was used for a battery with the above-mentioned configuration, whereby a non-aqueous electrolyte battery of Example 1 was produced.

EXAMPLES 2-13

Non-aqueous electrolyte batteries as shown in Table 1 were produced in the same way as in Example 1, except that one or both contents of 1,3-propanesultone and phthalic anhydride were varied in a range of 0.5 to 4% by mass.

COMPARATIVE EXAMPLE 1

A non-aqueous electrolyte battery was produced in the same way as in Example 1, except that 1,3-propanesultone and phthalic anhydride were not added to the electrolyte.

COMPARATIVE EXAMPLES 2-9

Non-aqueous electrolyte batteries shown in Table 1 were produced in the same way as in Example 1, except that the adding amount of 1,3-propanesultone or phthalic anhydride was set to be a value outside of the range of the present invention.

TABLE 1

| | Additive (% by mass) | | | Concentration of electrolyte salt (mol/dm$^3$) | | | Proportion of lithium salt A (mol %) |
|---|---|---|---|---|---|---|---|
| | Cyclic sultone derivative | Acid anhydride | Total | Lithium salt A LiPF$_6$ | LiBF$_4$ | Lithium salt B LiClO$_4$ | |
| Example 1 | 0.5 | 0.5 | 1 | 0 | 0 | 0.5 | 0 |
| Example 2 | 0.5 | 1 | 1.5 | 0 | 0 | 0.5 | 0 |
| Example 3 | 1 | 0.5 | 1.5 | 0 | 0 | 0.5 | 0 |
| Example 4 | 1 | 1 | 2 | 0 | 0 | 0.5 | 0 |
| Example 5 | 0.5 | 2 | 2.5 | 0 | 0 | 0.5 | 0 |
| Example 6 | 0.5 | 2.5 | 3 | 0 | 0 | 0.5 | 0 |
| Example 7 | 1 | 2 | 3 | 0 | 0 | 0.5 | 0 |
| Example 8 | 2 | 1 | 3 | 0 | 0 | 0.5 | 0 |
| Example 9 | 0.5 | 3 | 3.5 | 0 | 0 | 0.5 | 0 |
| Example 10 | 1.5 | 2 | 3.5 | 0 | 0 | 0.5 | 0 |
| Example 11 | 2 | 1.5 | 3.5 | 0 | 0 | 0.5 | 0 |
| Example 12 | 1 | 3 | 4 | 0 | 0 | 0.5 | 0 |
| Example 13 | 3 | 1 | 4 | 0 | 0 | 0.5 | 0 |
| Comparative Example 1 | 0 | 0 | 0 | 0 | 0 | 0.5 | 0 |
| Comparative Example 2 | 1 | 0 | 1 | 0 | 0 | 0.5 | 0 |
| Comparative Example 3 | 0 | 1 | 1 | 0 | 0 | 0.5 | 0 |
| Comparative Example 4 | 0 | 4 | 4 | 0 | 0 | 0.5 | 0 |
| Comparative Example 5 | 4 | 0 | 4 | 0 | 0 | 0.5 | 0 |
| Comparative Example 6 | 1 | 0.2 | 1.2 | 0 | 0 | 0.5 | 0 |
| Comparative Example 7 | 0.2 | 1 | 1.2 | 0 | 0 | 0.5 | 0 |
| Comparative Example 8 | 1 | 4 | 5 | 0 | 0 | 0.5 | 0 |
| Comparative Example 9 | 4 | 1 | 5 | 0 | 0 | 0.5 | 0 |

The batteries of Examples 1-13 and Comparative Examples 1-9 after stored at 120° C. for 350 hours were examined for load characteristics at a low temperature, expansion of a battery, and a capacity retention ratio. Table 2 shows the results. Methods for measuring the load characteristics at a low temperature, the expansion of a battery, and the capacity retention ratio are as follows.

Load Characteristics at a Low Temperature:

After stored at 120° C. for 350 hours, a battery was discharged at −40° C. and a current value of 2 mA, and a CCV after 5 seconds from the commencement of the discharge was measured.

Expansion of a Battery:

A battery was stored at 120° C. for 350 hours and allowed to cool to 20° C., and then, the thickness of the battery was measured. A value obtained by subtracting the thickness of the battery previously measured before storage from the thickness measured after cooling was determined as the expansion of the battery.

Capacity Retention Ratio:

First, a battery before stored at a high temperature was connected to a discharge resistor of 1 kΩ, and discharged at 20° C. to a termination voltage of 2.0 V. A discharge capacity at this time was measured. Another battery was stored at 120° C. for 350 hours and allowed to cool to 20° C. The battery was discharged under the same condition as that before storage, and a discharge capacity at this time was measured. The ratio of the discharge capacity thus obtained to that before storage was determined as a capacity retention ratio.

TABLE 2

|  | CCV at −40° C. (V) After 5 seconds from the discharge at 2 mA | Expansion of battery (mm) | Capacity retention ratio (%) |
|---|---|---|---|
| Example 1 | 2.92 | 0.30 | 90 |
| Example 2 | 2.95 | 0.25 | 92 |
| Example 3 | 2.94 | 0.24 | 92 |
| Example 4 | 2.92 | 0.15 | 94 |
| Example 5 | 2.90 | 0.09 | 93 |
| Example 6 | 2.88 | 0.06 | 92 |
| Example 7 | 2.95 | 0.10 | 95 |
| Example 8 | 2.89 | 0.12 | 94 |
| Example 9 | 2.85 | 0.06 | 91 |
| Example 10 | 2.85 | 0.10 | 93 |
| Example 11 | 2.80 | 0.08 | 94 |
| Example 12 | 2.65 | 0.05 | 87 |
| Example 13 | 2.60 | 0.05 | 89 |
| Comparative Example 1 | 1.90 | 0.80 | 67 |
| Comparative Example 2 | 2.77 | 0.45 | 77 |
| Comparative Example 3 | 2.80 | 0.40 | 79 |
| Comparative Example 4 | 2.52 | 0.09 | 80 |
| Comparative Example 5 | 2.49 | 0.10 | 77 |
| Comparative Example 6 | 2.81 | 0.41 | 82 |
| Comparative Example 7 | 2.81 | 0.42 | 83 |
| Comparative Example 8 | 2.33 | 0.04 | 84 |
| Comparative Example 9 | 2.24 | 0.03 | 85 |

As is apparent from Table 2, the batteries of Examples 1-13, with the cyclic sultone derivative and the acid anhydride added to an electrolyte in an amount of 0.5 to 3% by mass, had a high discharge voltage, less expanded when stored at a high temperature, and had a high capacity retention ratio. Thus, these batteries were suitable for use in a high-temperature atmosphere. Particularly, in the batteries of Examples 4-11 in which the total adding amount of the cyclic sultone derivative and the acid anhydride was 2 to 3.5% by mass, the generation of gas in a battery was reduced to suppress the expansion of the battery effectively while minimizing a decrease in discharge voltage, i.e., a decrease in load characteristics.

In contrast, the battery of Comparative Example 1, with no cyclic sultone derivative and acid anhydride added to an electrolyte, expanded largely when stored at a high temperature, and a discharge voltage was decreased remarkably and a capacity retention ratio was low. Furthermore, in the batteries of Comparative Examples 2-5 with either one of the cyclic sultone derivative and the acid anhydride added to an electrolyte, the effect of suppressing the expansion of a battery was not sufficient, or a decrease in discharge voltage was large. Thus, satisfactory storage characteristics were not obtained.

Furthermore, in the batteries of Comparative Examples 6-9 in which the cyclic sultone derivative and the acid anhydride were added to an electrolyte in an amount outside the range of the present invention, the effect of the coexistence of the additives was not sufficient, or a decrease in discharge voltage due to the addition of the additives exceeding a required amount was conspicuous. Thus, satisfactory storage characteristics were not obtained.

EXAMPLE 14

A non-aqueous electrolyte battery was produced in the same way as in Example 1, except that 0.5 mol/dm$^3$ of LiClO$_4$ and 0.05 mol/dm$^3$ of LiPF$_6$ were dissolved in a mixed solvent of propylene carbonate and 1,2-dimethoxyethane (1:1 in a volume ratio), and 1,3-propanesultone and phthalic anhydride were added in an amount of 0.5% by mass, respectively, to the mixture, thereby obtaining an electrolyte.

EXAMPLES 15-17

A non-aqueous electrolyte battery shown in Table 3 was produced in the same way as in Example 14, except that the adding amount of an additive and the kind and concentration of an electrolyte salt were varied.

EXAMPLE 18

A non-aqueous electrolyte battery shown in Table 3 was produced in the same way as in Example 17, except that LiClO$_4$ was used alone as an electrolyte salt, and lithium salt A was not contained.

COMPARATIVE EXAMPLE 10

A non-aqueous electrolyte battery was produced in the same way as in Example 16, except that the cyclic sultone derivative and the acid anhydride were not added to the electrolyte.

TABLE 3

|  | Additive (% by mass) | | | Concentration of electrolyte salt (mol/dm$^3$) | | | Proportion of lithium salt A (mol %) |
|---|---|---|---|---|---|---|---|
|  | Cyclic sultone derivative | Acid anhydride | Total | Lithium salt A | | Lithium salt B | |
|  |  |  |  | LiPF$_6$ | LiBF$_4$ | LiClO$_4$ |  |
| Example 14 | 0.5 | 0.5 | 1 | 0.05 | 0 | 0.5 | 9.1 |
| Example 15 | 2 | 1 | 3 | 0 | 0.05 | 0.5 | 9.1 |
| Example 16 | 2 | 1 | 3 | 0.1 | 0 | 0.5 | 16.7 |
| Example 17 | 1.5 | 1.5 | 3 | 0.03 | 0 | 0.4 | 7.0 |
| Example 18 | 1.5 | 1.5 | 3 | 0 | 0 | 0.5 | 0 |
| Comparative Example 10 | 0 | 0 | 0 | 0.1 | 0 | 0.5 | 16.7 |

The batteries of Examples 14-18 and Comparative Example 10 were examined for the expansion of a battery after stored at a high temperature when a discharge depth was 50% and 80%. Table 4 shows the results. A method for measuring the expansion of a battery is as follows.

Expansion of Batteries:

A battery was discharged until a discharge depth became 50%, and another battery was discharged until a discharge depth became 80%. Thereafter, these batteries were stored at 120° C. for 350 hours and allowed to cool to 20° C. The thickness of each battery at this time was measured. A value obtained by subtracting the thickness of each battery previously measured before storage from the thickness measured after cooling was determined as the expansion of each battery.

TABLE 4

|  | Expansion of battery (mm) | |
| --- | --- | --- |
|  | Discharge by 50% | Discharge by 80% |
| Example 14 | 0.20 | 0.15 |
| Example 15 | 0.20 | 0.08 |
| Example 16 | 0.15 | 0.05 |
| Example 17 | 0.20 | 0.10 |
| Example 18 | 0.20 | 0.70 |
| Comparative Example 10 | 0.55 | 0.10 |

As shown in Table 4, the batteries of Examples 14-17 less expanded even when stored after the discharge has proceeded, and the generation of gas was suppressed sufficiently. More specifically, in the batteries of Examples 14-17, a mixture of lithium salt A such as $LiPF_6$ and $LiBF_4$ and at least one lithium salt B other than the lithium salt A was used as an electrolyte salt for a non-aqueous electrolyte. The lithium salt A was contained in an amount of 2 mol % or more based on the total amount of the electrolyte salt, and at least one of the cyclic sultone derivative and the acid anhydride was added to the electrolyte, whereby the effect of the additive was maintained irrespective of a discharge depth.

In contrast, the battery of Comparative Example 10 expanded largely when stored at a relatively small discharge depth. Furthermore, the battery of Example 18 has substantially the same electrolyte composition as that of Example 10 or 11; however, the additive exhibited its effect effectively at a relatively small discharge depth, while the effect of the additive was eliminated when discharge has proceeded, allowing the battery to expand largely.

As described in Examples 14-17, when $LiPF_6$, $LiBF_4$, and the like are contained, the generation of gas can be suppressed when a battery is stored at a high temperature after discharge has proceeded. The reason for this is not made clear. However, it is presumed that $PF_5$ and $BF_3$ derived from an electrolyte salt react with a new phase of a negative active material formed due to discharge, and a coating of a fluoride is formed on the surface of the active material, whereby decomposition of an ester and ether of the electrolyte solvent is suppressed. EXAMPLE 19

A non-aqueous electrolyte battery shown in Table 5 was produced in the same way as in Example 1, except that 0.5 mol/dm³ of $LiClO_4$ was dissolved in a mixed solvent of propylene carbonate and diethoxyethane (1:1 in a volume ratio), and 1,3-propanesultone was added to the resultant mixture in an amount of 2% by mass to obtain an electrolyte, and a packing made of a tetrafluoroethylene-perfluoroalkoxyethylene copolymer was used.

EXAMPLE 20

A non-aqueous electrolyte battery was produced in the same way as in Example 19, except that diglyme was used in place of diethoxyethane.

EXAMPLE 21

A non-aqueous electrolyte battery was produced in the same way as in Example 19, except that 1,3-propanesultone was added to the electrolyte in an amount of 0.5% by mass.

EXAMPLE 22

A non-aqueous electrolyte battery was produced in the same way as in Example 19, except that 1,3-propanesultone was added to the electrolyte in an amount of 5% by mass.

COMPARATIVE EXAMPLE 11

A non-aqueous electrolyte battery was produced in the same way as in Example 19, except that dimethoxyethane was used in place of diethoxyethane.

COMPARATIVE EXAMPLE 12

A non-aqueous electrolyte battery was produced in the same way as in Comparative Example 11, except that a packing made of polypropylene was used.

COMPARATIVE EXAMPLE 13

A non-aqueous electrolyte battery was produced in the same way as in Comparative Example 11, except that 1,3-propanesultone was not added to the electrolyte.

COMPARATIVE EXAMPLE 14

A non-aqueous electrolyte battery was produced in the same way as in Comparative Example 11, except that 1,3-propanesultone was added to the electrolyte in an amount of 10% by mass.

TABLE 5

|  | Material for packing | Electrolyte solvent | Adding amount of cyclic sultone derivative (% by mass) |
| --- | --- | --- | --- |
| Example 19 | PFA | Propylene carbonate + diethoxyethane | 2 |
| Example 20 | PFA | Propylene carbonate + diglyme | 2 |
| Example 21 | PFA | Propylene carbonate + diethoxyethane | 0.5 |
| Example 22 | PFA | Propylene carbonate + diethoxyethane | 5 |
| Comparative Example 11 | PFA | Propylene carbonate + dimethoxyethane | 2 |
| Comparative Example 12 | PP | Propylene carbonate + dimethoxyethane | 2 |
| Comparative Example 13 | PFA | Propylene carbonate + dimethoxyethane | 0 |
| Comparative Example 14 | PFA | Propylene carbonate + dimethoxyethane | 10 |

The batteries of Examples 19-22 and Comparative Examples 11-14 were examined for load characteristics at a room temperature, expansion of a battery, and a capacity retention ratio after stored at 120° C. for 200 hours. Table 6 shows the results. Methods for measuring the load characteristics at a room temperature, the expansion of a battery, and the capacity retention ratio are as follows.

Load Characteristics at a Room Temperature:

After stored at 120° C. for 200 hours, a battery was connected to a discharge resistor of 200Ω and discharged at 20° C. and a CCV after 5 seconds from the commencement of the discharge was measured.

Expansion of a Battery:

A battery was stored at 120° C. for 200 hours and allowed to cool to 20° C., and then, the thickness of the battery was measured. A value obtained by subtracting the thickness of the battery previously measured before storage from the thickness measured after cooling was determined as the expansion of the battery.

Capacity Retention Ratio:

First, a battery before stored at a high temperature was connected to a discharge resistor of 3.9Ω, and discharged at 20° C. to a termination voltage of 2.0 V. A discharge capacity at this time was measured. Another battery was stored at 120° C. for 200 hours and allowed to cool to 20° C. The battery was discharged under the same condition as that before storage, and a discharge capacity at this time was measured. The ratio of the discharge capacity thus obtained to that before storage was determined as a capacity retention ratio.

TABLE 6

|  | CCV at 20° C. (V) After 5 seconds from discharge at 200 Ω | Expansion of battery (mm) | Capacity retention ratio (%) |
| --- | --- | --- | --- |
| Example 19 | 2.93 | 0.11 | 97 |
| Example 20 | 2.90 | 0.08 | 96 |
| Example 21 | 2.95 | 0.13 | 95 |
| Example 22 | 2.89 | 0.06 | 96 |
| Comparative Example 11 | 2.95 | 0.15 | 97 |
| Comparative Example 12 | 2.23 | 0.20 | 72 |
| Comparative Example 13 | 1.90 | 0.80 | 70 |
| Comparative Example 14 | 2.05 | 0.03 | 78 |

As is apparent from Table 6, the batteries of Examples 19-22, in which an ether having a boiling point of 120° C. or higher was contained as an electrolyte solvent, a cyclic sultone derivative was added to the electrolyte in an amount of 0.5 to 5% by mass, and sealing was conducted with a packing made of a heat-resistant resin, had a high discharge voltage, less expanded when stored at a high temperature, and had a high capacity retention ratio. Thus, these batteries were suitable for use in a high-temperature atmosphere.

In contrast, the battery of Comparative Example 11, in which dimethoxyethane having a boiling point of 84° C. was contained in place of an ether having a boiling point of 120° C. or higher, exhibited load characteristics enhanced to some degree; however, it expanded largely to increase the inner pressure therein.

Furthermore, the battery of Comparative Example 12, in which a packing made of polypropylene was used in place of the packing in Comparative Example 11, expanded largely when stored at a high temperature compared with Comparative Example 11 and had a substantially low discharge voltage and capacity retention ratio. The reason for this is considered as follows: the sealing performance of the battery was decreased, causing the electrolyte solvent to dissipate out of the battery and water to enter the battery.

Furthermore, in the battery of Comparative Example 13 with no cyclic sultone derivative added thereto or the battery of Comparative Example 14 with an excess amount of cyclic sultone derivative added thereto, a decrease in discharge voltage was conspicuous. Thus, satisfactory storage characteristics were not obtained.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A non-aqueous electrolyte primary battery comprising a positive electrode, a negative electrode, a separator, a non-aqueous electrolyte, and a sealing member,
    wherein the positive electrode comprises a manganese-containing oxide as a positive active material,
    the negative electrode comprises one selected from the group consisting of lithium and a lithium alloy as a negative active material,
    the non-aqueous electrolyte comprises a solvent and a cyclic sultone derivative,
    the solvent comprises a carbonic ester and ether, and
    the sealing member comprises one selected from the group consisting of (1) a packing made of a heat-resistant resin and (2) a glass hermetic seal.

2. The non-aqueous electrolyte primary battery according to claim 1, wherein the manganese-containing oxide is a manganese dioxide.

3. The non-aqueous electrolyte primary battery according to claim 1, wherein the carbonic ester has a boiling point of 120° C. or higher.

4. The non-aqueous electrolyte primary battery according to claim 1, wherein the ether has a boiling point of 120° C. or higher.

5. The non-aqueous electrolyte primary battery according to claim 1, wherein the cyclic sultone derivative comprises at least one selected from the group consisting of 1,3-propanesultone and 1,4-butanesultone.

6. The non-aqueous electrolyte primary battery according to claim 1, wherein an adding amount of the cyclic sultone derivative is 0.5 to 3 wt % based on a total amount of the non-aqueous electrolyte.

7. The non-aqueous electrolyte primary battery according to claim 1, wherein the packing has a melting point exceeding 240° C.

8. The non-aqueous electrolyte primary battery according to claim 1, wherein the packing comprises at least one selected from the group consisting of a tetrafluoroethylene-perfluoroalkoxyethylene copolymer, a polyphenylene sulfide, and a polyether ether ketone.

9. The non-aqueous electrolyte primary battery according to claim 1, wherein the non-aqueous electrolyte comprises a lithium salt.

10. The non-aqueous electrolyte primary battery according to claim 1, wherein the non-aqueous electrolyte further comprises an acid anhydride.

* * * * *